US006815021B1

(12) United States Patent
Ishikawa et al.

(10) Patent No.: US 6,815,021 B1
(45) Date of Patent: Nov. 9, 2004

(54) RECORDING MEDIUM FOR INK JET PRINTERS

(75) Inventors: Takayuki Ishikawa, Kanagawa-ken (JP); Nobuhiro Kubota, Shizuoka-ken (JP); Minoru Tsuchida, Shizuoka-ken (JP); Shigeki Asai, Shizuoka-ken (JP); Takeshi Yoshimoto, Shizuoka-ken (JP); Kiyoshi Iwamoto, Shizuoka-ken (JP); Jun Sugiyama, Nagano-ken (JP); Hiroyuki Onishi, Nagano-ken (JP); Yukari Ishikawa, Kanagawa-ken (JP)

(73) Assignees: Seiko Epson Corporation, Tokyo (JP); Tomoegawa Paper Co., Ltd., Tokyo (JP)

( * ) Notice: Subject to any disclaimer, the term of this patent is extended or adjusted under 35 U.S.C. 154(b) by 0 days.

(21) Appl. No.: 09/538,207

(22) Filed: Mar. 30, 2000

(30) Foreign Application Priority Data

Apr. 2, 1999 (JP) .......................................... 11-095846

(51) Int. Cl.[7] .................................................. B32B 3/00

(52) U.S. Cl. ................. 428/32.3; 428/32.34; 428/32.38

(58) Field of Search ................................ 428/195, 212, 428/323, 500, 32.3, 32.34, 32.38

(56) References Cited

U.S. PATENT DOCUMENTS

| | | | | | |
|---|---|---|---|---|---|
| 5,576,088 | A | * | 11/1996 | Ogawa et al. | 428/327 |
| 5,677,067 | A | * | 10/1997 | Kojima et al. | 428/478.2 |
| 5,912,085 | A | * | 6/1999 | Ito et al. | 428/500 |
| 5,919,559 | A | * | 7/1999 | Nakano et al. | 428/331 |
| 6,037,050 | A | * | 3/2000 | Saito et al. | |
| 6,071,611 | A | * | 6/2000 | Ohta et al. | 428/343 |
| 6,174,056 | B1 | * | 1/2001 | Sakaki et al. | 347/100 |
| 6,217,166 | B1 | * | 4/2001 | Saito et al. | 347/100 |
| 6,224,971 | B1 | * | 5/2001 | Tomizawa et al. | 428/331 |
| 6,242,082 | B1 | * | 6/2001 | Mukoyoshi et al. | 428/212 |
| 6,245,422 | B1 | * | 6/2001 | Onishi et al. | 428/331 |

FOREIGN PATENT DOCUMENTS

| | | |
|---|---|---|
| EP | 0 275 100 | 7/1988 |
| EP | 0 365 307 | 4/1990 |
| EP | 0 439 363 | 7/1991 |
| EP | 0 543 339 | 5/1993 |
| EP | 0 688 677 | 12/1995 |
| EP | 0 914 962 | 5/1999 |
| EP | 1 010 738 | 6/2000 |
| EP | 1 095 785 | 5/2001 |
| GB | 2 321 901 | 8/1998 |
| JP | 02-208366 | 8/1990 |
| JP | 06-155895 | 6/1994 |
| JP | 08-174995 | 7/1996 |
| JP | 08-246393 | 9/1996 |
| JP | 09-086033 | 3/1997 |
| JP | 09-164762 | 6/1997 |
| JP | 10-119421 | 5/1998 |
| JP | 10-181184 | 7/1998 |
| JP | 10-211764 | 8/1998 |
| JP | 10-287037 | 10/1998 |
| WO | 99/33669 | 7/1999 |

* cited by examiner

*Primary Examiner*—B. Shewareged
(74) *Attorney, Agent, or Firm*—Scully, Scott, Murphy & Presser

(57) ABSTRACT

The present invention provides a recording medium for ink jet printers in which superior image recording quality and color stability are exhibited. In a recording medium for ink jet printers in which an ink receiving layer contained at least pigment and binder resin is provided on a supporting material, partially saponified PVA having a degree of saponification of 85.0 to 73.0 mol % and a degree of polymerization of 300 to 1500, is contained in the ink receiving layer as a color stability improving component.

5 Claims, No Drawings

RECORDING MEDIUM FOR INK JET PRINTERS

BACKGROUND OF THE INVENTION

The present invention relates to a recording medium, and in particular, relates to a technique for improving color stability and image recording quality such as printing density, ink absorptivity, and image shelf-life.

An ink jet recording technique in which a water-soluble ink is output and printed on a medium for recording has characteristics such as vividness of recorded images, as well as high speed, low noise, ease of coloring, etc., whereby, the popularization thereof has increased in recent years. As a recording medium which effectively reflects the characteristics of the ink jet recording technique, the following recording medium has been provided. The recording medium is one in which an ink receiving layer having characteristics, in which water-soluble ink is sufficiently absorbed, thereby yielding in vivid images, is laminated on the surface of a supporting material such as paper primarily made from pulp. A coating solution is prepared by dispersing pigment in an ink receiving agent such as silica and binder resin such as carboxyl modified polyvinyl alcohol. An ink receiving layer is laminated thereon by coating the coating solution on the surface of a supporting material.

However, in recent years, typical ink jet printers using ink jet recording techniques are becoming cheaper, and vivid coloration of printed images is anticipated. As a result, such printers are often used professionally, such as in color proofreading (for example, test printing in plate-making step), etc. In this case, the required level of color stability is increased, as is the image recording quality such as printing density, ink absorbability (high-speed printing property), image shelf-life (light resistance, water resistance, moisture resistance, etc.). Therefore, in order to expand applications of a recording medium for ink jet printers, it is necessary that requirements for these properties be sufficiently satisfied in the present situation.

SUMMARY OF THE INVENTION

It is an object of the present invention to provide a recording medium for ink jet printers in which all properties such as color stability and image recording quality, e.g., printing density, ink absorptivity, and image shelf-life can be exhibited at high levels.

According to the results that the inventors have obtained from various research with regard to a recording medium for ink jet printers, in which an ink receiving layer containing at least pigment and binder resin is coated on a supporting material, a recording medium for ink jet printers in which the image recording quality such as printing density, ink absorptivity, image shelf-life (light resistance, water resistance, moisture resistance, etc.), and the like are superior and in which color stability is preferable, can be obtained by containing a specific water-soluble material as a color stability improving component in an ink receiving layer, and have thereby attained the present invention. The color stability in the present invention is defined as a property in which the values of CIE L*, a*, and b* of color directly after recording do not change as time elapses, that is to say, a property in which the values of CIE L*, a*, and b* of the ultimate target color are achieved in the shortest time. In other words, it is defined as a property in which the color difference ΔE between the color immediately after recording and that after time has elapsed does not increase as time elapses. As a color stability improving component to be contained therein, partially saponified polyvinyl alcohol, acetoacetyl modified polyvinyl alcohol, carboxylic acid modified polyvinylacetal, polyethylene glycol derivatives, and secondary alcohol ethoxylate type surfactants, can be employed alone or in combination. The present invention further specifies these components. In the following, materials composing the recording medium for ink jet printers according to the present invention will be explained.

(1) Supporting Material

As a supporting material provided for an ink receiving layer, a base paper which is mixed wood pulp, such as a chemical pulp such as LBKP, NBKP, or the like; mechanical pulp such as GP, PGW, RMP, TMP, CTMP, CMP, CGP, or the like; recycled pulp such as DIP, or the like; etc.; or synthetic fiber pulp such as polyethylene fiber, or the like, as a primary component, with pigment and any type of additive which is typically employed in paper, such as sizing agents, yield improving agents, strengthening agents, or the like, alone or in combination, as necessary, and produced by using any type of paper-making apparatus such as a fourdrinier paper machine, cylinder paper machine, twin wire paper machine, or the like; can be preferably employed. In addition, a base paper provided with starch, polyvinyl alcohol, casein, gelatin, or the like using a size press; a base paper provided with an anchor coat layer; an art paper, a coated paper, a cast coat paper, or the like, in which baryta paper treatment is carried out so as to be usable for photographic printing papers, can be preferably employed. These supporting materials are provided with an ink receiving layer thereon; however, in order to improve smoothness or coating property of the ink receiving layer, or to produce a finish like that of photographic print paper, these supporting materials may be further calendered before coating the ink receiving layer thereon, using a calender apparatus such as a machine calender, TG calender, soft calender, or the like.

In the case in which a laminate material is employed on the supporting material, synthetic resin such as polyolefin, polyethylene, polypropylene, polyester, nylon, rayon, polyurethane, etc., and film material comprised of these synthetic resins, which is porous from the beginning in order to prevent air resistance from being too high, or which is a very thin film so as to become porous by heating, etc., may be employed.

In order to optimally design the recording medium for ink jet printers, it is preferable that the smoothness of the coating surface on the supporting material be increased to be as high as possible by a method in which the rigidity thereof is not deteriorated. As a value for the smoothness, the smoothness measured by the Ohken method smoothness test according to "J. TAPPI paper and pulp test method No. 5" is preferably 100 seconds or more, is more preferably 500 seconds or more, and is most preferably 1500 seconds or more. In the case in which the rigidity of the supporting material is too low or is too high, problems are likely to occur in paper feed processes through printers. Therefore, a rigidity measured at 20° C. and 65% RH by the Gurley method rigidity test according to "J. TAPPI paper and pulp test method No. 40" is preferably 400 to 3600 mN in the machining direction and 200 to 1800 mN in the cross direction, and is more preferably 800 to 2500 mN in the machining direction and 400 to 1000 mN in the cross direction.

(2) Ink Receiving Layer

A. Pigment

In an ink receiving layer according to the present invention, generally, well-known pigments which are insoluble or slightly soluble in water can be employed alone or in combination. For example, a white inorganic pigment such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomite, calcium silicate, magnesium silicate, synthetic amorphous silica, colloidal silica, colloidal alumina, pseudo-boehmite, aluminum hydroxide, alumina, lithopone, zeolite, hydrolytic halloysite, magnesium carbonate, magnesium hydroxide, etc.; an organic pigment such as styrene-type plastic pigment, acrylic-type plastic pigment, polyethylene, microcapsules, urea resin, melamine resin, etc., or the like, can be employed.

A primary component in the ink receiving layer is generally composed of a white pigment. As such a white pigment, a porous inorganic pigment is preferable since drying properties and absorptivity of inks for ink jet printers is superior. For example, porous synthetic amorphous silica, porous magnesium carbonate, porous alumina, or the like, are preferably employed. A pigment in which both printing quality and shelf-life (shelf-life in a room or resistance to direct sunlight) are satisfied, is preferable. Therefore, the precipitation type or the gel type of porous synthetic amorphous silica or porous alumina, having a specific surface of about 200 to 600 g/m$^2$, can be preferably employed.

B. Binder Resin

As primary binder resin contained in an ink receiving layer according to the present invention, polyvinyl alcohol such as partially saponified polyvinyl alcohol, carboxylic acid modified polyvinyl alcohol, silyl modified polyvinyl alcohol, etc.; starch derivatives such as oxidized starch, etherified starch, etc.; cellulose derivatives such as carboxymethyl cellulose, hydroxyethyl cellulose, etc.; casein, gelatin, soybean protein, or the like, can be employed alone or in combination in consideration of the image shelf-life, etc. Of these, partially saponified polyvinyl alcohol and carboxylic acid modified polyvinyl alcohol are preferable since adhesive properties and image shelf-life are superior. The degree of saponification of these polyvinyl alcohols is preferably 90.0 to 78.0 mol %, and is more preferably 85.0 to 73.0 mol %, since the image shelf-life characteristics, such as light resistance, are affected depending on the difference in miscibility between these polyvinyl alcohols and other raw materials. The degree of polymerization is preferably about 1100 to 1800 in order to ensure adhesive properties.

As other binder resin, in order to improve the water resistance and the moisture resistance, conjugate diene copolymer emulsions such as maleic anhydride resin, styrene-butadiene copolymer, methylmethacrylate-butadiene copolymer, etc.; acrylic polymer emulsions such as (metha)acrylic acid ester polymer, (metha)acrylic acid ester copolymer, etc.; vinylic polymer emulsion such as ethylene-vinylacetate copolymer, etc.; functional group modified polymer emulsions comprised of monomers including functional groups such as carboxyl groups, etc., of all types of these polymers; copolymer resin emulsions such as melamine resin, urea resin, polymethylmethacrylate, polyurethan resin, unsaturated polyester resin, vinylchloride-vinylacetate copolymer, polyvinylbutyral, alkyd resin, etc., can be preferably employed with the primary binder resin such as the above described partially saponified polyvinyl alcohol, in a range which does not interfere with light resistance. Of these jointly used binder resins, ethylene-vinylacetate copolymer resin emulsion and polyurethane resin emulsion are more preferable as jointly used binder resins since they are particularly effective for improving the image shelf-life (light resistance, water resistance, and moisture resistance).

The compounding ratio of the pigment to the binder resin in the ink receiving layer is selected in a range in which there is an even balance among the ink receiving layer strength, the glossiness adjusting layer strength as described below, and the image recording quality such as ink absorptivity, etc. Specifically, it is preferable that the ratio of pigment/binder resin be 3/7 to 1/1 and the ratio of primary binder resin/jointly used binder resin be 55/45 to 19/1, and it is more preferable that the ratio of pigment/binder resin be 4/6 to 1/1 and the ratio of primary binder resin/jointly used binder resin be 3/2 to 3/1. If there is too much pigment, adhesive strength of the binder resin is insufficient, whereby breakage may occur in the ink receiving layer during producing, or breakage may occur in the glossiness adjusting layer in the case in which the glossiness adjusting layer is provided when necessary, so that productivity is decreased. In contrast, if there is too much binder resin, the air resistance increases, whereby the image recording quality such as the ink absorbability, etc., is deteriorated.

C. Color Stability Improving Component

As described above, a primary feature of the present invention is that, as a color stability improving component, partially saponified polyvinyl alcohol, acetoacetyl modified polyvinyl alcohol, carboxylic acid modified polyvinylacetal resin, polyethylene glycol derivative, or secondary alcohol ethoxylate type surfactant, is contained alone or in combination in the ink receiving layer. In the following, these color stability improving components are described in detail.

C-1. Partially Saponified Polyvinyl Alcohol

The degree of saponification of the partially saponified polyvinyl alcohol is preferably 85.0 to 73.0 mol %, and is more preferably 80.0 to 78.0 mol %. The degree of polymerization of the partially saponified polyvinyl alcohol is preferably 300 to 1500, and is more preferably 800 to 1300.

C-2. Acetoacetyl Modified Polyvinyl Alcohol

The degree of saponification of the acetoacetyl modified polyvinyl alcohol is preferably 92.0 to 73.0 mol %, and is more preferably 92.0 to 78.0 mol %. The degree of polymerization of the acetoacetyl modified polyvinyl alcohol is preferably 300 to 1500, and is more preferably 800 to 1300. The degree of acetoacetyl modification of the acetoacetyl modified polyvinyl alcohol is preferably 6.5 to 0.5 mol %, and is more preferably 4.0 to 1.5 mol %. However, in the case in which the degree of saponification ranges from 73.0 to 85.0 mol %, even if the degree of acetoacetyl modification is less than 0.5 mol %, the color stability corresponds to the above partially saponified polyvinyl alcohol and is superior. In the case in which the degree of acetoacetyl modification is 6.5 to 0.5 mol %, even if the degree of saponification of the partially saponified polyvinyl alcohol exceeds 85.0 mol %, the color stability is satisfactory. Therefore, the acetoacetyl modified polyvinyl alcohol is most preferable in which the degree of saponification is 85.0 to 73.0 mol % and the degree of acetoacetyl modification is 6.5 to 0.5 mol % as a material for obtaining superior color stability.

C-3. Carboxylic Acid Modified Polyvinylacetal Resin

The degree of acetalization of the carboxylic acid modified polyvinylacetal resin is preferably 10.0 to 40.0 mol %, and is more preferably 20.0 to 30.0 mol %. The viscosity in a 20% solution of the carboxylic acid modified polyvinylacetal resin is preferably 3000 to 6000 cps, and is more preferably 4000 to 5000 cps. The residual hydroxyl group of the carboxylic acid modified polyvinylacetal resin is preferably 35.0 to 65.0 mol %, and is more preferably 40.0 to 55.0 mol %.

C-4. Polyethylene Glycol Derivative

The molecular weight of the polyethylene glycol derivative is preferably 200 to 6000, and is more preferably 200 to 2000.

C-5. Secondary Alcohol Ethoxylate Type Surfactant

The HLB (hydrophile-lipophile balance) value of the secondary alcohol ethoxylate type surfactant is preferably 8.0 to 14.0, and is more preferably 10.0 to 12.0.

Of the above color stability improving components, the polyethylene glycol derivative and the secondary alcohol ethoxylate type surfactant adversely affect the color stability outside the above range and are therefore not preferable. The partially saponified polyvinyl alcohol, the acetoacetyl modified polyvinyl alcohol, and the carboxylic acid modified polyvinylacetal resin adversely affect not only the color stability, but also the image shelf-life (mainly light resistance) outside the above range and are therefore not preferable. At least one of these color stability improving components must be contained in the ink receiving layer, and another two or more may be contained in the ink receiving layer.

The partially saponified polyvinyl alcohol, the acetoacetyl modified polyvinyl alcohol, and the carboxylic acid modified polyvinylacetal resin can be employed as binder resin (in particular, as primary binder resin) composing the ink receiving layer. That is, according to a preferred embodiment of the present invention, the binder resin also serves as a color stability improving component. Thus, the number of materials employed can be decreased.

The content ratio of the above color stability improving components in the ink receiving layer is preferably 1.0 to 25.0% by weight to total solid components in the ink receiving layer, and is more preferably 3.0 to 15.0% by weight.

In the case in which the binder resin also serves as a color stability improving component, in order to ensure the adhesive properties for adhesion to a supporting material, it is preferable that the degree of polymerization of the partially saponified polyvinyl alcohol be 1100 to 1300, the degree of polymerization of the acetoacetyl modified polyvinyl alcohol be 1100 to 1500, and the viscosity in a 20% solution of the carboxylic acid modified polyvinylacetal resin be 4000 to 5000 cps. When the binder resin also serves as a color stability improving component, the binder resin in an amount of 20 to 50% by weight is contained in the ink receiving layer.

D. Other Additives

Furthermore, as other additives which may be added to the ink receiving layer, light resistance improving agents, dye/pigment fixing agents, pigment dispersing agents, thickeners, flow improving agents, defoaming agents, foaming inhibitors, surface lubricants, foaming agents, penetrating agents, color dyes, color pigments, fluorescent brightening agents, antiseptics, water resistant agents, hardening agents, etc., can be blended in appropriate amounts as necessary.

In the present invention, an additive which has a protective antifading effect on images when added to the ink receiving layer, is defined as a light resistance improving agent as described above. As this light resistance improving agent, water-soluble divalent or greater metallic salts, ultraviolet absorbing agents, antioxidants, etc., can be employed. As the above dye fixing agents, cationic dye fixing agents can be suitably employed, and as this cationic dye fixing agent, a material such as the polyamine resin type, the quaternary ammonium salt resin type, etc., can be employed. It is believed that these light resistance improving agents and cationic dye fixing agents have synergistic effects. Therefore, in order to further improve the image recording quality, the light resistance improving agent and the cationic dye fixing agent are preferably employed jointly in the ink receiving layer, and the solid content ratio of the light resistance improving agent/the cationic dye fixing agent is preferably 4/1 to 1/1, and is more preferably 3/2 to 1/1. Furthermore, the solid content ratio of pigment and binder resin/the other additives is preferably 19/1 to 4/1, and is more preferably 9/1 to 4/1.

In addition, as the above ultraviolet absorbing agent and antioxidant, liquid esterified functional sites (ultraviolet ray absorptive sites, antioxidative functional sites) with polyvalent carboxylic acids, or dispersion types dispersed by surfactants, is more preferable than powdered types to be mixed in polyolefin resin.

(3) Glossiness Adjusting Layer

According to a preferable embodiment of the present invention, in order to obtain increased value, a glossiness adjusting layer is laminated over most of the surface of the ink receiving layer. For a medium in which for example, high glossiness is required, it is preferable that the glossiness adjusting layer have a glossiness of 10 or more as measured by a 60 degree specular glossiness test method.

For example, a mixture of binder resin and pigment used in the above ink receiving layer is prepared as a coating solution (coating solution of glossiness adjusting layer precursor), and then this is coated on the surface of the ink receiving layer; therefore, a glossiness adjusting layer is laminated thereon. Water-soluble acrylic resin as a binder resin, and colloidal silica or colloidal alumina as a pigment, are preferable, respectively. The glossiness can correspond to a medium having medium glossiness or slight glossiness by changing the type of binder resin or the ratio of the pigment blended therein.

As a compounding ratio of binder resin and pigment in the glossiness adjusting layer, from the viewpoint of maintaining sufficient glossiness, a ratio of the contained binder resin to the pigment is preferably 5 to 50% by weight, and is more preferably 5 to 30% by weight. A basis weight in which the glossiness adjusting layer exhibits superior glossiness without deteriorating properties of the ink receiving layer is preferably 3 to 25 $g/m^2$, and is more preferably 5 to 15 $g/m^2$.

The ink receiving layer of the recording medium for ink jet printers according to the present invention is laminated on a supporting material by coating thereon a coating solution which primarily consists of the above pigment, binder resin, and color stability improving components, and to which is added other additives, as necessary. From the viewpoint of which of these materials satisfy all conditions in which image recording quality and adhesive property to the supporting material are sufficient and in which problems in the production such as powdering of the layer in cutting process are avoided, a solid content ratio of pigment, binder resin, or other additives mixed as a standard is preferably 40 to 60% by weight, 20 to 40% by weight, or 1 to 40% by weight, respectively.

The ink receiving layer and the glossiness adjusting layer each are provided as at least one layer; however, either layer thereof may be provided as two or more layers, and both layers thereof may be provided as two layers or three layers.

Next, a method for laminating the ink receiving layer and the glossiness adjusting layer on the supporting material will be explained.

The each material above for composing the ink receiving layer is prepared at suitable compounding ratios, and is dissolved or dispersed in a suitable solvent such as water, alcohol, etc., and a coating solution for forming the ink receiving layer is thereby obtained. The coating solution is coated on a supporting material by using a coating apparatus such as a blade coater, roll coater, air knife coater, bar coater, rod blade coater, size press, etc., on-machine or off-machine as appropriate. The coating weight of the ink receiving layer in the one layer type is preferably 5.0 to 30.0 g/m$^2$, and is more preferably 5.0 to 20.0 g/m$^2$. In the case of the two layer type in which a first ink receiving layer is provided on a supporting material and a second ink receiving layer is provided on the first ink receiving layer, the coating weight of the first ink receiving layer is preferably 5.0 to 30.0 g/m$^2$, and is more preferably 5.0 to 20.0 g/m$^2$. In addition, the coating weight of the second ink receiving layer is preferably 5.0 to 15.0 g/m$^2$, and is more preferably 5.0 to 10.0 g/m$^2$. In the case in which the coating weight is below the above range, superior ink absorptivity or fixativity is seldom obtained. In the case in which it is above this range, problems such as powdering of the layer, etc., occur, so that the productivity is decreased or the production costs are increased. In particular, in the case in which the coating weight of the second ink receiving layer is more than 15 g/m$^2$, it is difficult for the ink to pass through to the second ink receiving layer, thereby causing blurring of ink, so that vividness of images is impaired. Thus, it is preferred that the coating weight of the ink receiving layer be controlled depending on the number of the provided ink receiving layers. The coated ink receiving layer may be finished using a calender such as a machine calender, TG calender, super calender, soft calender, etc.

In a step in which the ink receiving layer is provided by coating the coating solution for an ink receiving layer on the supporting material (a step before the glossiness adjustment layer is laminated), it is necessary to maintain the overall air resistance to a required level, even if the glossiness adjusting layer is provided. The air resistance measured by the Ohken method of air resistance test according to "J. TAPPI paper and pulp test method No. 5" is preferably 10 to 5000 seconds, is more preferably 10 to 4000 seconds, and is most preferably 10 to 3000 seconds. The air resistance of the last media cannot be lowered below this value. As a result, in the case in which the air resistance exceeds 5000 seconds, the image recording quality, such as the ink absorbability, is easily lowered and is therefore not preferable. Even in the case in which the glossiness adjusting layer is laminated, the strength thereof is insufficient, whereby peeling or breakage may occur, or the ink absorbability of the last media is lowered, and as a result, lowering of the image recording quality occurs. Therefore, maintaining the above air resistance is necessary.

As a method for laminating the glossiness adjusting layer on the ink receiving layer, for example, a well-known specularity drum cast method can be employed. However, in order to produce the recording medium for ink jet printers according to the present invention, the following method is more preferable. According to the method, a coating solution of glossiness adjusting layer precursor is coated on an ink receiving layer laminated on a supporting material, whereby a coating solution layer is laminated; a film having smooth surfaces, and chosen depending on the glossiness adjusting layer to be coated, for example, polyolefin resin film, polytetrafluoroethylene film, peelable silicon processing-finished resin film, etc., is adhered to this coating solution layer; and then, after the coating solution layer is dried, this film is removed, and a glossiness adjusting layer is thereby formed.

Even if a glossiness adjusting layer is continuously laminated on an ink receiving layer on-machine directly after the coating process of the ink receiving layer, the coating state of the glossiness adjusting layer does not become inferior, whereby deterioration of the image recording quality, such as the ink absorbability, is not observed. If the glossiness adjusting layer is laminated off-machine, the air resistance of the overall medium, etc., can be more easily adjusted, and therefore the image recording quality can be more minutely controlled.

BEST MODE FOR CARRYING OUT THE INVENTION

The effects according to the present invention will be illustrated by explanations of the Examples and the Comparative Examples. As a supporting material, wood-free paper having a basic weight of 90.0 g/m$^2$ was employed in each Example and in each Comparative Example. The coating materials were prepared by dissolving or dispersing the materials described below in water and ink receiving layers and glossiness adjusting layers were provided by coating the coating materials for the ink receiving layer on both surfaces of this supporting material, and then drying, respectively. Thus, a recording medium for ink jet printers was formed. In the Examples, the weight ratio of dried solid was used. Unless otherwise noted, the coating volumes of the ink receiving layer and the glossiness adjusting layer were 10.0 g/m$^2$.

Materials for Ink Receiving Layer

EXAMPLE 1

Binder resin

Maleic acid modified PVA (trade name: Gohsenal T-350; produced by The Nippon Synthetic Chemical Industry Co., Ltd.), 24.0% by weight Ethylene-vinyl acetate emulsion (trade name: Panflex OM-5500; produced by Kuraray Co., Ltd.), 6.0% by weight Color stability improving component Partially saponified PVA having a degree of saponification of 76.5 to 79.0%; a degree of polymerization of 900 (trade name: Kuraray-Poval L-9-78; produced by Kuraray Co., Ltd.), 10.0% by weight White pigment Silica (trade name: Mizukasil P78D; produced by Mizusawa Industrial Chemicals Ltd.), 40.0% by weight Cationic dye fixing agent Polyamine dye fixing agent (trade name: Sumirese resin 1001; produced by Sumitomo Chemical Co., Ltd.), 10.0% by weight Light resistance improving agent Water-soluble divalent or greater metallic salt (trade name: Magnesium Chloride S; produced by Tomita Pharmaceutical Co., Ltd.), 10.0% by weight

EXAMPLE 2

Binder resin

Maleic acid modified PVA (trade name: Gohsenal T-350; produced by The Nippon Synthetic Chemical Industry Co., Ltd.), 24.0% by weight Ethylene-vinyl acetate emulsion (trade name: Panflex OM-5500; produced by Kuraray Co., Ltd.), 6.0% by weight Color stability improving component Acetoacetyl modified PVA having a degree of saponification of 92.0 to 94.0%; a degree of polymerization of 1400 to 1500; a degree of acetoacetyl modification of 4 to 5 mol % (trade name: Gohsefimer Z-320; produced by The Nippon Synthetic Chemical Industry Co., Ltd.), 10.0% by weight White pigment Silica (trade name: Mizukasil P78D; produced by Mizusawa Industrial Chemicals Ltd.), 40.0% by weight Cationic dye fixing agent Polyamine dye fixing agent (trade name: Sumirese resin 1001; produced by Sumitomo Chemical Co., Ltd.), 10.0% by weight Light resistance improving agent Water-soluble divalent or greater metallic salt (trade name: Magnesium Chloride S; produced by Tomita Pharmaceutical Co., Ltd.), 10.0% by weight

EXAMPLE 3

Binder resin

Maleic acid modified PVA (trade name: Gohsenal T-350; produced by The Nippon Synthetic Chemical Industry Co., Ltd.), 24.0% by weight Ethylene-vinyl acetate emulsion (trade name: Panflex OM-5500; produced by Kuraray Co., Ltd.), 6.0% by weight Color stability improving component Polyvinylacetal resin having a degree of acetalization of 27±3%; viscosity in a 20% solution of 4000±2000 cps; residual hydroxyl group of 51±3 mol % (trade name: Esrec K KW-23; produced by Sekisui Chemical Co., Ltd.), 10.0% by weight White pigment Silica (trade name: Mizukasil P78D; produced by Mizusawa Industrial Chemicals Ltd.), 40.0% by weight Cationic dye fixing agent Polyamine dye fixing agent (trade name: Sumirese resin 1001; produced by Sumitomo Chemical Co., Ltd.), 10.0% by weight Light resistance improving agent Water-soluble divalent or greater metallic salt (trade name: Magnesium Chloride S; produced by Tomita Pharmaceutical Co., Ltd.), 10.0% by weight

EXAMPLE 4

Binder resin

Maleic acid modified PVA (trade name: Gohsenal T-350; produced by The Nippon Synthetic Chemical Industry Co., Ltd.) 24.0% by weight Ethylene-vinyl acetate emulsion (trade name: Panflex OM-5500; produced by Kuraray Co., Ltd.), 6.0% by weight Color stability improving component Polyethylene glycol derivative having a molecular weight of 600 (trade name: Adeka PEG PEG-600; produced by Asahi Denka Kogyo K.K.), 10.0% by weight White pigment Silica (trade name: Mizukasil P78D; produced by Mizusawa Industrial Chemicals Ltd.), 40.0% by weight Cationic dye fixing agent Polyamine dye fixing agent (trade name: Sumirese resin 1001; produced by Sumitomo Chemical Co., Ltd.), 10.0% by weight Light resistance improving agent Water-soluble divalent or greater metallic salt (trade name: Magnesium Chloride S; produced by Tomita Pharmaceutical Co., Ltd.), 10.0% by weight

EXAMPLE 5

Binder resin

Acetoacetyl modified PVA having a degree of saponification of 92.0 to 94.0%; a degree of polymerization of 1400 to 1500; a degree of acetoacetyl modification of 4 to 5 mol % (trade name: Gohsefimer Z-320; produced by The Nippon Synthetic Chemical Industry Co., Ltd.), 34.0% by weight Ethylene-vinyl acetate emulsion (trade name: Panflex OM-5500; produced by Kuraray Co., Ltd.), 6.0% by weight Color stability improving component The binder resin also serves as a color stability improving component.

White pigment

Silica (trade name: Mizukasil P78D; produced by Mizusawa Industrial Chemicals Ltd.), 40.0% by weight Cationic dye fixing agent Polyamine dye fixing agent (trade name: Sumirese resin 784S; produced by Sumitomo Chemical Co., Ltd.), 10.0% by weight Light resistance improving agent Water-soluble divalent or greater metallic salt (trade name: Magnesium Chloride S; produced by Tomita Pharmaceutical Co., Ltd.), 10.0% by weight

EXAMPLE 6

Binder resin

Partially saponified PVA having a degree of saponification of 78.0 to 81.0%; a degree of polymerization of 1500 to 1600 (trade name: Kuraray-Poval PVA-415; produced by Kuraray Co., Ltd.), 34.0% by weight Ethylene-vinyl acetate emulsion (trade name: Panflex OM-5500; produced by Kuraray Co., Ltd.), 6.0% by weight Color stability improving component The binder resin also serves as a color stability improving component.

White pigment

Silica (trade name: Mizukasil P78D; produced by Mizusawa Industrial Chemicals Ltd.), 40.0% by weight Cationic dye fixing agent Polyamine dye fixing agent (trade name: Sumirese resin 784S; produced by Sumitomo Chemical Co., Ltd.), 10.0% by weight Light resistance improving agent Water-soluble divalent or greater metallic salt (trade name: Magnesium Chloride S; produced by Tomita Pharmaceutical Co., Ltd.), 10.0% by weight

EXAMPLE 7

Binder resin

Polyvinylacetal resin having a degree of acetalization of 27±3%; viscosity in a 20% solution of 4000±2000 cps; residual hydroxyl group of 51±3 mol % (trade name: Esrec K KW-23; produced by Sekisui Chemical Co., Ltd.), 34.0% by weight Ethylene-vinyl acetate emulsion (trade name: Panflex OM-5500; produced by Kuraray Co., Ltd.), 6.0% by weight Color stability improving component The binder resin also serves as a color stability improving component.

White pigment

Silica (trade name: Mizukasil P78D; produced by Mizusawa Industrial Chemicals Ltd.), 40.0% by weight Cationic dye fixing agent Polyamine dye fixing agent (trade name: Sumirese resin 784S; produced by Sumitomo Chemical Co., Ltd.), 10.0% by weight Light resistance improving agent Water-soluble divalent or greater metallic salt (trade name: Magnesium Chloride S; produced by Tomita Pharmaceutical Co., Ltd.), 10.0% by weight

EXAMPLE 8

Binder resin

Maleic acid modified PVA (trade name: Gohsenal T-350; produced by The Nippon Synthetic Chemical Industry Co., Ltd.), 24.0% by weight Ethylene-vinyl acetate emulsion (trade name: Panflex OM-5500; produced by Kuraray Co., Ltd.), 6.0% by weight Color stability improving component Acetoacetyl modified PVA having a degree of saponification of 92.0 to 94.0%; a degree of polymerization of 1400 to 1500; a degree of acetoacetyl modification of 4 to 5 mol % (trade name: Gohsefimer Z-320; produced by The Nippon Synthetic Chemical Industry Co., Ltd.), 5.0% by weight Polyvinylacetal resin having a degree of acetalization of 27±3%; viscosity in a 20% solution of 4000±2000 cps; residual hydroxyl group of 51±3 mol % (trade name: Esrec K KW-23; produced by Sekisui Chemical Co., Ltd.), 5.0% by weight White pigment Silica (trade name: Mizukasil P78D; produced by Mizusawa Industrial Chemicals Ltd.), 40.0% by weight Cationic dye fixing agent Polyamine dye fixing agent (trade name: Sumirese resin 1001; produced by Sumitomo Chemical Co., Ltd.), 10.0% by weight Light resistance improving agent Water-soluble divalent or greater metallic salt (trade name: Magnesium Chloride S; produced by Tomita Pharmaceutical Co., Ltd.), 10.0% by weight

EXAMPLE 9

Binder resin

Maleic acid modified PVA (trade name: Gohsenal T-350; produced by The Nippon Synthetic Chemical Industry Co., Ltd.), 24.0% by weight Ethylene-vinyl acetate emulsion (trade name: Panflex OM-5500; produced by Kuraray Co., Ltd.), 6.0% by weight Color stability improving component Acetoacetyl modified PVA having a degree of saponification of 92.0 to 94.0%; a degree of polymerization of 1400 to 1500; a degree of acetoacetyl modification of 4 to 5 mol % (trade name: Gohsefimer Z-320; produced by The Nippon Synthetic Chemical Industry Co., Ltd.), 5.0% by weight Partially saponified PVA having a degree of saponification of 76.5 to 79.0%; a degree of polymerization of 900 (trade name: Kuraray-Poval L-9-78; produced by Kuraray Co., Ltd.), 5.0% by weight White pigment Silica (trade name: Mizukasil P78D; produced by Mizusawa Industrial Chemicals Ltd.), 40.0% by weight Cationic dye fixing agent Polyamine dye fixing agent (trade name: Sumirese resin 1001; produced by Sumitomo Chemical Co., Ltd.), 10.0% by weight Light resistance improving agent Water-soluble divalent or greater metallic salt (trade name: Magnesium Chloride S; produced by Tomita Pharmaceutical Co., Ltd.), 10.0% by weight

EXAMPLE 10

Binder resin

Maleic acid modified PVA (trade name: Gohsenal T-350; produced by The Nippon Synthetic Chemical Industry Co., Ltd.), 24.0% by weight Ethylene-vinyl acetate emulsion (trade name: Panflex OM-5500; produced by Kuraray Co., Ltd.), 6.0% by weight Color stability improving component Secondary alcohol ethoxylate type surfactant having a HLB value of 12.0 (trade name: Adekatol SO-120; produced by Asahi Denka Kogyo K.K.), 10.0% by weight White pigment Silica (trade name: Mizukasil P78D; produced by Mizusawa Industrial Chemicals Ltd.), 40.0% by weight Cationic dye fixing agent Polyamine dye fixing agent (trade name: Sumirese resin 1001; produced by Sumitomo Chemical Co., Ltd.), 10.0% by weight Light resistance improving agent Water-soluble divalent or greater metallic salt (trade name: Magnesium Chloride S; produced by Tomita Pharmaceutical Co., Ltd.), 10.0% by weight

Comparative Example 1

Binder resin

Maleic acid modified PVA (trade name: Gohsenal T-350; produced by The Nippon Synthetic Chemical Industry Co., Ltd.), 24.0% by weight Ethylene-vinyl acetate emulsion (trade name: Panflex OM-5500; produced by Kuraray Co., Ltd.), 6.0% by weight Color stability improving component Partially saponified PVA having a degree of saponification of 98.0 to 99.0%; a degree of polymerization of 1700 (trade name: Kuraray-Poval PVA-117; produced by Kuraray Co., Ltd.), 10.0% by weight White pigment Silica (trade name: Mizukasil P78D; produced by Mizusawa Industrial Chemicals Ltd.), 40.0% by weight Cationic dye fixing agent Polyamine dye fixing agent (trade name: Sumirese resin 1001; produced by Sumitomo Chemical Co., Ltd.), 10.0% by weight Light resistance improving agent Water-soluble divalent or greater metallic salt (trade name: Magnesium Chloride S; produced by Tomita Pharmaceutical Co., Ltd.), 10.0% by weight

Comparative Example 2

Binder resin

Maleic acid modified PVA (trade name: Gohsenal T-350; produced by The Nippon Synthetic Chemical Industry Co., Ltd.), 24.0% by weight Ethylene-vinyl acetate emulsion (trade name: Panflex OM-5500; produced by Kuraray Co., Ltd.), 6.0% by weight Color stability improving component Acetoacetyl modified PVA having a degree of saponification of 99.0% or more; a degree of polymerization of 1100; a degree of acetoacetyl modification of 4 to 5 mol % (trade name: Gohsefimer Z-200; produced by The Nippon Synthetic Chemical Industry Co., Ltd.), 10.0% by weight White pigment Silica (trade name: Mizukasil P78D; produced by Mizusawa Industrial Chemicals Ltd.), 40.0% by weight Cationic dye fixing agent Polyamine dye fixing agent (trade name: Sumirese resin 1001; produced by Sumitomo Chemical Co., Ltd.), 10.0% by weight Light resistance improving agent Water-soluble divalent or greater metallic salt (trade name: Magnesium Chloride S; produced by Tomita Pharmaceutical Co., Ltd.), 10.0% by weight

Comparative Example 3

Binder resin

Maleic acid modified PVA (trade name: Gohsenal T-350; produced by The Nippon Synthetic Chemical Industry Co., Ltd.), 24.0% by weight Ethylene-vinyl acetate emulsion (trade name: Panflex OM-5500; produced by Kuraray Co., Ltd.), 6.0% by weight Color stability improving component Polyvinylacetal resin having a degree of acetalization of 9±3%; viscosity in a solution of 3000±2000 cps; residual hydroxyl group of 69±3 mol % (trade name: Esrec K KW-1; produced by Sekisui Chemical Co., Ltd.), 10.0% by weight White pigment Silica (trade name: Mizukasil P78D; produced by Mizusawa Industrial Chemicals Ltd.), 40.0% by weight Cationic dye fixing agent Polyamine dye fixing agent (trade name: Sumirese resin 1001; produced by Sumitomo Chemical Co., Ltd.), 10.0% by weight Light resistance improving agent Water-soluble divalent or greater metallic salt (trade name: Magnesium Chloride S; produced by Tomita Pharmaceutical Co., Ltd.), 10.0% by weight Comparative Example 4

Binder resin

Maleic acid modified PVA (trade name: Gohsenal T-350; produced by The Nippon Synthetic Chemical Industry Co., Ltd.), 24.0% by weight Ethylene-vinyl acetate emulsion (trade name: Panflex OM-5500; produced by Kuraray Co., Ltd.), 6.0% by weight Color stability improving component Polyethylene glycol derivative having a molecular weight of 20000 (trade name: Adeka PEG PEG-20000; produced by Asahi Denka Kogyo K.K.), 10.0% by weight White pigment Silica (trade name: Mizukasil P78D; produced by Mizusawa Industrial Chemicals Ltd.), 40.0% by weight Cationic dye fixing agent Polyamine dye fixing agent (trade name: Sumirese resin 1001; produced by Sumitomo Chemical Co., Ltd.), 10.0% by weight Light resistance improving agent Water-soluble divalent or greater metallic salt (trade name: Magnesium Chloride S; produced by Tomita Pharmaceutical Co., Ltd.), 10.0% by weight Comparative Example 5

Binder resin

Acetoacetyl modified PVA having a degree of saponification of 99.0% or more; a degree of polymerization of 1100; a degree of acetoacetyl modification of 4 to 5 mol % (trade name: Gohsefimer Z-200; produced by The Nippon Synthetic Chemical Industry Co., Ltd.), 34.0% by weight Ethylene-vinyl acetate emulsion (trade name: Panflex OM-5500; produced by Kuraray Co., Ltd.), 6.0% by weight Color stability improving component The binder resin also serves as a color stability improving component.

White pigment

Silica (trade name: Mizukasil P78D; produced by Mizusawa Industrial Chemicals Ltd.), 40.0% by weight Cationic dye fixing agent Polyamine dye fixing agent (trade name: Sumirese resin 1001; produced by Sumitomo Chemical Co., Ltd.), 10.0% by weight Light resistance improving agent Water-soluble divalent or greater metallic salt (trade name: Magnesium Chloride S; produced by Tomita Pharmaceutical Co., Ltd.), 10.0% by weight Comparative Example 6

Binder resin

Partially saponified PVA having a degree of saponification of 98.0 to 99.0%; a degree of polymerization of 1700 (trade name: Kuraray-Poval PVA-117; produced by Kuraray Co., Ltd.), 34.0% by weight Ethylene-vinyl acetate emulsion (trade name: Panflex OM-5500; produced by Kuraray Co., Ltd.), 6.0% by weight Color stability improving component The binder resin also serves as a color stability improving component.

White pigment

Silica (trade name: Mizukasil P78D; produced by Mizusawa Industrial Chemicals Ltd.), 40.0% by weight Cationic dye fixing agent Polyamine dye fixing agent (trade name: Sumirese resin 1001; produced by Sumitomo Chemical Co., Ltd.), 10.0% by weight Light resistance improving agent Water-soluble divalent or greater metallic salt (trade name: Magnesium Chloride S; produced by Tomita Pharmaceutical Co., Ltd.), 10.0% by weight Comparative Example 7

Binder resin

Polyvinylacetal resin having a degree of acetalization of 9±13%; viscosity in a 20% solution of 3000±2000 cps; residual hydroxyl group of 69±3 mol % (trade name: Esrec K KW-1; produced by Sekisui Chemical Co., Ltd.), 34.0% by weight Ethylene-vinyl acetate emulsion (trade name: Panflex OM-5500; produced by Kuraray Co., Ltd.), 6.0% by weight Color stability improving component The binder resin also serves as a color stability improving component.

White pigment

Silica (trade name: Mizukasil P78D; produced by Mizusawa Industrial Chemicals Ltd.), 40.0% by weight Cationic dye fixing agent Polyamine dye fixing agent (trade name: Sumirese resin 1001; produced by Sumitomo Chemical Co., Ltd.), 10.0% by weight Light resistance improving agent Water-soluble divalent or greater metallic salt (trade name: Magnesium Chloride S; produced by Tomita Pharmaceutical Co., Ltd.), 10.0% by weight The above materials are employed in the ink receiving layer of Examples 1 to 10 and Comparative Examples 1 to 7, and common materials are employed in all glossiness adjusting layers respectively provided on the ink receiving layers consisting of the above materials. The materials are as follows.

Materials for Glossiness Adjusting Layer

Binder resin

Maleic acid modified PVA (trade name: Gohsenal T-350; produced by The Nippon Synthetic Chemical Industry Co., Ltd.), 10.0% by weight White pigment Colloidal Silica (trade name: Snowtex UP; produced by Nissan Chemical Industries, Ltd.), 45.0% by weight Colloidal Silica (trade name: Snowtex XL; produced by Nissan Chemical Industries, Ltd.), 45.0% by weight Subsequently, with regard to the recording media for ink jet printers obtained in Examples 1 to 10 and the comparative recording media for ink jet printers obtained in Comparative Examples 1 to 7, objects for evaluation, such as color patches or the like, were printed on these sheets using an ink jet printer (trade name: PM-750C; produced by Seiko Epson Corporation), thereby obtaining superior printed images. Color stability and image shelf-life (light resistance, water resistance, moisture resistance, etc.) were evaluated by the means described below using these printing images.

1. Color Stability

Color patches (black OD value: 1.0 or 0.6) were printed on the recording media for ink jet printers according to Examples 1 to 10 and Comparative Examples 1 to 7. The recording media were left in a controlled room in which the temperature was 26° C. and the relative humidity was 55%, for 24, 48, or 72 hours, respectively, and were employed as samples for evaluation. The L*, a* and b* values of the recording media were measured using a spectrophotometer (trade name: GRETAG SPM50; produced by Gretag Macbeth Corporation). Each ΔE is defined as the difference between these values of the recording media immediately after printing and those after 24, 48, or 72 hours, respectively. The color stability was evaluated according to the ΔE value.

A: cases where ΔE is less than 3 and is fixed after 48 hours

B: cases where ΔE is 3 to 4 and is fixed after 72 hours

C: cases where ΔE is more than 4 and increases even after 72 hours

In the present invention, with respect to dark gray or light gray, readily distinguishable as different colors (black OD value: 1.0 or 0.6), cases where ΔE is 2 or less after 24 hours and is fixed to 3 or less after 48 hours, are defined as having superior color stability. In contrast, cases where ΔE is more than 4 and increases even after 72 hours, are defined as having inferior color stability.

2. Light Resistance

Light resistance 1 (Remaining Ratio of Refraction Density)

As an exposure test, a magenta color patch on the recording medium for ink jet printers was irradiated by UV radiation at 30 kJ/m$^2$ under the conditions black panel temperature: 63° C.; relative humidity: 50%; radiation power of ultraviolet at 340 nm: 0.35 W/m$^2$, using a xenon whether-ometer (trade name: Ci-5000, produced by Atlas Electric Devices Co.). The refraction densities of the irradiated magenta color patch and the original were measured, using a spectrophotometer (trade name: GRETAG SPM50; produced by Gretag Macbeth Corporation), and the light resistance 1 corresponding to the remaining ratio of refraction density was evaluated.

A: cases where the refraction density of the irradiated color patch is more than 90% of the original refraction density B: cases where the refraction density of the irradiated color patch is 80 to 90% of the original refraction density C: cases where the refraction density of the irradiated color patch is less than 80% of the original refraction density Light Resistance 2 (Yellow Stain Prevention)

As an exposure test, the recording medium for ink jet printers was irradiated by UV radiation at 30 kJ/m$^2$ under the conditions black panel temperature: 63° C.; relative humidity: 50%; radiation power of ultraviolet at 340 nm: 0.35 W/m$^2$, using a xenon whether-ometer (trade name: Ci-5000, produced by Atlas Electric Devices Co.). The L*, a* and b* values of the recording media after the UV radiation and before the UV radiation were obtained by using a spectrophotometer (trade name: GRETAG SPM50; produced by Gretag Macbeth Corporation). ΔE is defined as the difference between these values of the recording media after the UV radiation and before the UV radiation, the degree of the yellow stain was evaluated according to the ΔE value.

A: cases where ΔE is less than 5

B: cases where ΔE is 5 to 10

C: cases where ΔE is more than 10

Light Resistance 3 (Remaining Ratio of Refraction Density)

Yellow, magenta, cyan, and black color patches were left near a windowpane facing south for about 1 month. Thereafter, the average of the remaining ratio of the refraction density was obtained by measuring the refraction density of these test color patches and the originals, using a spectrophotometer (trade name: GRETAG SPM50; produced by Gretag Macbeth Corporation), and the light resistance 3 was evaluated according to the following criteria.

A: cases where the refraction density of the test color patch is more than 90% of the original refraction density B: cases where the refraction density of the test color patch is 80 to 90% of the original refraction density C: cases where the refraction density of the test color patch is less than 80% of the original refraction density Light Resistance 4

Red, green, and blue color patches were left near a windowpane facing south for about 1 month. Thereafter, the L*, a* and b* values were obtained by measuring the refraction density of these test color patches and the originals, using a spectrophotometer (trade name: GRETAG SPM50; produced by Gretag Macbeth Corporation). ΔE is defined as the difference between the values of the test color patch and those of the original, and ΔEavg is defined as the average of each ΔE; the light resistance 4 was evaluated according to the following criteria.

A: cases where ΔEavg is less than 5

B: cases where ΔEavg is 5 to 10

C: cases where ΔEavg is more than 10

3. Shelf-life in a Room

The printed images (portraits) on the recording medium for ink jet printers were placed on a wall, 2 m from a window facing north, for about 6 months. Thereafter, the shelf-life in the room was evaluated by visual inspection of these test sheets and the originals.

A: cases where differences between these test sheets and the originals is not observed B: cases where differences between these test sheets and the originals is observed 4. Shelf-life in a Clear File (Yellow Stain Prevention in Clear File Folders)

The recording media for ink jet printers were inserted into clear file folders (trade name: CL-A420; produced by MITSUBISHI PENCIL CO., LTD.) so that these sheets protruded from the clear file folders about 2 cm, and they were stored at 60° C. for 2 weeks. Thereafter, the color difference ΔE (CIE L*a*b*) between the yellow stains of these test sheets and the originals was measured, using a spectrophotometer (trade name: GRETAG SPM50; produced by Gretag Macbeth Corporation), and the shelf-life in a clear file folders was evaluated according to the following criteria.

A: cases where the color difference is less than 2

B: cases where the color difference is 2 to 5

C: cases where the color difference is more than 5

5. Ink Absorptivity

Images were printed on the recording medium by an ink jet printer and the ink absorptivity was evaluated by observing multicolor bleeding and unicolor bleeding thereon. The evaluation is performed by comparing the ink absorptivities of genuine glossy papers (trade name: glossy paper for super-fine (thick-type) photoprint paper; produced by Seiko Epson Corporation) by visual inspection. In the following, the difference in the SCID image refers to a comparison with respect to extremely fine Standard Color Image Data (N1 portrait image and N3 fruit basket image of ISO/JIS-SCID according to Japanese Industrial Standard X9201-1995)

A: cases where the problem is not observed at all in practice and ink absorptivity is superior (equal to or greater than)

B: cases where the problem is not observed in practice and ink absorptivity is superior (slightly inferior, but differences in the SCID image is not observed)

C: cases where ink absorptivity is inferior in practice (differences in the SCID image is observed)

6. Image Water Resistance

Letters in yellow, magenta, cyan, red, green, blue, and black, printed on the recording medium for ink jet printers each had one drop of water placed thereon by a syringe, and were air-dried. The water resistance was evaluated according to the following criteria.

A: cases where running of the dye is not observed

B: cases where running of the dye is observed, but the letter can still be read

C: cases where the letter cannot be read

7. Image Moisture Resistance

Color patches of yellow, magenta, cyan, red, green, blue and black were printed on the recording medium. The sheet was left in high humidity conditions (temperature: 40° C., humidity: 85%) for 3 days and nights, and the image moisture resistance was evaluated by observing color change and bleeding at the outline of the color patches.

A: cases where the problem is not observed at all in practice and image moisture resistance is superior (color change and bleeding at the outline is not observed at all)

B: cases where the problem is not observed in practice and image moisture resistance is superior (slight bleeding is observed)

C: cases where image moisture resistance is inferior in practice

8. Ink Receiving Layer Water Resistance 5 ml of water was dripped on the ink receiving layer and was rubbed thereon. Then occurrences of breaks, peeling, etc., were observed in the ink receiving layer, and the ink receiving layer water resistance was evaluated according to the following criteria.

A: cases where ink receiving layer water resistance is superior (breaks, peeling, etc., are not observed in the ink receiving layer.)

B: cases where the problem is not observed at all in practice and ink receiving layer water resistance is superior (slight peeling of the ink receiving layer is observed, but images are maintained.)

C: cases where the problem use is observed in practice (the ink receiving layer is broken and is completely peeled off)

9. Glossiness Adjusting Layer Water Resistance 5 ml of water was dripped on the glossiness adjusting layer and was rubbed thereon. Then occurrences of breaks, peeling, etc., were observed in the glossiness adjusting layer, and the glossiness adjusting layer water resistance was evaluated according to the following criteria.

A: cases where glossiness adjusting layer water resistance is superior (breaks, peeling, etc., are not observed in the glossiness adjusting layer)

B: cases where the problem is not observed at all in practice and glossiness adjusting layer water resistance is superior (slight peeling of the glossiness adjusting layer is observed, but images are maintained)

C: cases where the problem is observed in practice (the glossiness adjusting layer is broken and is completely peeled off)

The evaluated results of Examples 1 to 10 are shown in Table 1, and the evaluated results of Comparative Examples 1 to 7 are shown in Table 2.

TABLE 1

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Color Stability | B | A | A | B | A | A | A | A | A | B |
| Light Resistance 1 | A | A | A | A | A | A | A | A | A | A |
| Light Resistance 2 | A | A | A | A | A | A | A | A | A | A |
| Light Resistance 3 | A | A | A | A | A | A | A | A | A | A |
| Light Resistance 4 | A | A | A | A | A | A | A | A | A | A |
| Shelf-life in a Room | A | A | A | A | A | A | A | A | A | A |
| Shelf-life in a Clear File | A | A | A | A | A | A | A | A | A | A |
| Ink Absorptivity | A | A | A | A | A | A | A | A | A | A |
| Image Water Resistance | A | A | A | A | A | A | A | A | A | A |
| Image Moisture Resistance | A | A | A | A | A | A | A | A | A | A |
| Ink Receiving Layer Water Resistance | A | A | A | A | A | A | A | A | A | A |
| Glossiness Adjusting Layer Water Resistance | A | A | A | A | A | A | A | A | A | A |

TABLE 2

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Color Stability | C | C | C | C | C | C | C |
| Light Resistance 1 | B | B | B | B | B | B | B |
| Light Resistance 2 | B | B | B | B | B | B | B |
| Light Resistance 3 | B | B | B | B | B | B | B |
| Light Resistance 4 | B | B | B | B | B | B | B |

TABLE 2-continued

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Shelf-life in a Room | A | A | A | A | A | A | A |
| Shelf-life in a Clear File | A | A | A | A | A | A | A |
| Ink Absorptivity | A | A | A | A | A | A | A |
| Image Water Resistance | A | A | A | A | A | A | A |
| Image Moisture Resistance | A | A | A | A | A | A | A |
| Ink Receiving Layer Water Resistance | A | A | A | A | A | A | A |
| Glossiness Adjusting Layer Water Resistance | A | A | A | A | A | A | A |

According to Table 1, the recording media for ink jet printers of Examples received favorable evaluations since most evaluations were mostly A with a few B, and it was found that the recording media for ink jet printers of the Examples are superior with respect to image recording quality and color stability, and there was no problem at all in practice. In contrast, according to Table 2, it was found that the recording media for ink jet printers of the Comparative Examples were inferior to those of the Examples, particularly with respect to color stability. Therefore, it was demonstrated that the color stability improvement component contained in the ink receiving layer according to the present invention was very effective.

As explained above, according to the present invention, a specific color stability improving component is contained in the ink receiving layer; therefore, a recording medium can be provided for ink jet printers in which the image recording quality such as printing density, ink absorptivity, image shelf-life (light resistance, water resistance, moisture resistance, etc.), and the like are superior, and the color stability is very preferable. Furthermore, the invention also has effects which are satisfactory high speed printing techniques since the ink absorptivity is superior.

What is claimed is:

1. A recording medium for ink jet printers, comprising an ink receiving layer containing at least pigment and binder resin, wherein said ink receiving layer contains at least two chosen from partially saponified polyvinyl alcohol having a degree of saponification of 85.0 to 73.0 mol % and a degree of polymerization of 300 to 1500; acetoacetyl modified polyvinyl alcohol having a degree of saponification of 92.0 to 73.0 mol % a degree of polymerization of 300 to 1500, and a degree of acetoacetyl modification of 6.5 to 0.5 mol %; carboxylic acid modified polyvinylacetyl resin having a degree of acetalization of 10.0 to 40.0 mol %, viscosity in a 20% solution of 3000 to 6000 cps, and residual hydroxyl group of 35.0 to 65.0 mol %; and secondary alcohol ethoxylate type surfactant having a hydrophilic-lipophile balance value of 8.0 to 14.0, as a color stability improving component.

2. A recording medium for ink jet printers according to claim 1, wherein said binder resin also serves as a color-stability-improving component.

3. A recording medium for ink jet printers according to claim 1, wherein the amount of solid in said color-stability-improving component within said ink receiving layer is 1.0 to 25.0% by weight.

4. A recording medium for ink jet printers according to claim 1, wherein a glossiness-adjusting layer is disposed on a surface of said ink receiving layer.

5. A recording medium for ink jet printers according to claim 1, wherein said glossiness-adjusting layer has a 60 degree specular glossiness of at least 10.

* * * * *